United States Patent [19]

Maya et al.

[11] Patent Number: 5,767,618
[45] Date of Patent: Jun. 16, 1998

[54] FLAT COMPACT FLUORESCENT LAMP WITH INTER-CHANNEL DISCHARGE SUPPRESSION

[75] Inventors: Jakob Maya, Brookline; Munisamy Anandan, Burlington, both of Mass.

[73] Assignee: Matsushita Electric Works Research and Development Laboraties Inc., Woburn, Mass.

[21] Appl. No.: 599,389

[22] Filed: Feb. 9, 1996

[51] Int. Cl.⁶ .................................................. H01J 17/16
[52] U.S. Cl. ........................................ 313/493; 313/634
[58] Field of Search .................................. 313/493, 634, 313/573, 610, 635, 491, 636, 483

[56] References Cited

U.S. PATENT DOCUMENTS

| | | | |
|---|---|---|---|
| 2,405,518 | 8/1946 | Polevitzky | 313/493 |
| 2,406,146 | 8/1946 | Holmes | 176/122 |
| 2,501,376 | 3/1950 | Breadner et al. | 176/122 |
| 2,555,749 | 6/1951 | Krefft | 313/109 |
| 3,247,415 | 4/1966 | Martyny | 313/109 |
| 3,258,630 | 6/1966 | Scott | 313/109 |
| 3,646,383 | 2/1972 | Jones et al. | 313/109 |
| 4,839,555 | 6/1989 | O'Mahoney | 313/493 |
| 5,041,762 | 8/1991 | Hartai | 315/169.3 |
| 5,479,069 | 12/1995 | Winsor | 313/493 |

*Primary Examiner*—Sandra L. O'Shea
*Assistant Examiner*—Joseph Williams

[57] ABSTRACT

A flat compact fluorescent lamp is disclosed. The lamp contains a fill of mercury and inert gas. It includes a top panel and bottom glass panel and a convoluted glass partition having a substantially planar upper surface disposed between the inner surfaces of the top and bottom panels. The partition forms a convoluted channel having an initial and a terminal end. One edge of the partition is integrally molded with the bottom panel and a peripheral portion is joined to the inner surface of the top panel. An inner portion of the partition can engage the inner surface of the top panel. The inner portion has a predetermined width at the point of its engagement and a predetermined spacing between the point and the top panel. A layer of frit of predetermined thickness is used to join the peripheral portion of the convoluted partition to the inner surface of the top panel. The frit layer forms a sealed envelope with the top and bottom panels, whereby to provide the predetermined spacing and form a convoluted channel within the envelope. A conventional phosphor coating is disposed on the inner surface of the envelope and at least two electrodes are disposed at the initial and terminal ends of the convolution whereby an arc can be formed in the lamp between the electrodes thereby to excite the phosphor to emit light.

13 Claims, 3 Drawing Sheets under atmospheric pressure for bowing of the panel so as to engage the tops of the inner portion of the partition.

FLAT COMPACT FLUORESCENT LAMP WITH INTER-CHANNEL DISCHARGE SUPPRESSION

BACKGROUND OF THE INVENTION

1. Field of the Invention

The present invention relates to substantially flat compact fluorescent lamps and especially to fluorescent lamps having at least one spiral channel formed by a spiral partition disposed between a pair of substantially flat panels. Preferably, the channel is molded in one of the panels and forms an integral part of that panel. The other panel is sealed only to the periphery of partition forming the channel to form an envelope.

2. Cross-Reference to Related Applications

In U.S. Ser. No. 08/291,887, filed Aug. 17, 1994, by Maya et al., a disclosure is made of a "Substantially Flat Compact Fluorescent Lamp." In U.S. Ser. No. 08/452,312, filed May 26, 1995, by Anandan et al., disclosure is made of "A Method of Manufacturing Substantially Flat Compact Fluorescent Lamp." Each of the applications is assigned to the same assignee as the present application.

3. Description of the Prior Art

Conventional fluorescent lamps have an elongated tubular envelope construction with electrodes disposed at either end. When a potential is imposed upon the electrodes, mercury ions and excited mercury atoms form and produce ultraviolet light which in turn excite a phosphor coating to emit visible light. A recent improvement in fluorescent lamps is a so-called compact fluorescent lamp. Such compact fluorescent lamps are fabricated by bending a tubular glass envelope into a U-shape or even bending it several times to form quadruple U-shapes. Since the brightness of the fluorescent lamp is dependent upon the length of the envelope, such complex bending operations are necessary to obtain a high light output. Even with complex bending, the compact fluorescent lamps tend to be rather long and require external fixtures, especially when they are employed for uses which require directionality. Moreover, compact fluorescent lamps can operate at excessively high temperatures which produce high mercury vapor pressures beyond the optimum value needed for maximum lumen efficiency. Such high operating temperatures can also reduce the life of the components of the lamp.

Lamps in the form of flat panels with channels in them are well known to the art. For example, U.S. Pat. No. 2,405,518, to Polevitzky, discloses a molded cup formed of a ceramic, plastic or stamped metal. A spiral partition is disposed within the cup and electrodes are placed at each end of the spiral partition. A glass cover or top panel is disposed over the face of the chamber formed by the cup and is hermetically sealed to a flange to provide a closure. We have found that such lamps do not function adequately because the arc discharge between the electrodes will not always follow the spiral path created by metallic partitions due to uncontrolled physical gaps between the edges of the partition and the top panel, especially at the edge which abuts the cup near the peripheral electrode of the lamp. Such uncontrolled physical gaps provide for short-circuiting of the arc to the channel directly from the peripheral electrode. Moreover, inter-channel discharges can occur as a result of the uncontrolled gap. Patentee's use of a fluorescent enamel to insulate the lamp can result in porosity and cracks in the enamel where current will flow through the metal thus short circuiting the gas discharge. Other patents related to flat fluorescent lamps include the U.S. Pat. No. 2,406,146, to Holmes, wherein a fluorescent lamp with a spiral channel discharge is disclosed. The patent does not address the problem of inter-channel discharge in the lamp. In the U.S. Pat. No. 2,501,376, to Breadner et al., an opposing spiral channel discharge is disclosed wherein inter-channel discharge was eliminated by fusing ridges which form the spiral partitions to opposing panels. Such fusing of ridges and panels is quite expensive. The Krefft patent, U.S. Pat. No. 2,555,749, discloses a channel fluorescent lamp wherein intermediate walls are not sealed together and no consideration is made for the width of the gap between the tops of the partition and the envelope. Because the lamp is made of molded parts, they will not bow inwardly to any great extent. The U.S. Pat. No. 3,247,415, to Martyny, discloses a fluorescent panel lamp in which internal partitions were pressed with low pressure under heat for fusion to prevent inter-channel discharge. The device is quite expensive to manufacture because of the requirement for sealing the channels. Scott, U.S. Pat. No. 3,258,630, discloses a channel discharge lamp with a sinuous path. No disclosure is made in the patent of a criticality of preventing inter-channel discharge by minimizing the gap between the partitions and the face of the lamp.

SUMMARY OF THE INVENTION

According to the present invention we provide a flat fluorescent lamp having a fill of mercury and an inert gas. The lamp is formed of two panels and a convoluted glass partition having a flat top surface is disposed between the panels. One of the panels is a glass molded part with a convoluted channel formed by glass molding techniques. The channel is formed in the panel by a convoluted partition. The channel runs continuously from the periphery of the panel to the center of the lamp. The other panel is a top panel and is attached with a layer of glass frit of a predetermined thickness to the peripheral portion of the partition whereby to form a hermetically sealed envelope. When the frit layer is considered, the portion of the partition forming the periphery of the lamp has a predetermined height which is slightly greater than the height of the inner portion of the partition. Thus, when sealed into an envelope, the center of the panel will sag slightly inwardly due to atmospheric pressure whereby to engage the tops of the inner portion of the partition. The width of the tops of the inner portion of the partition is predetermined so as to provide a significant area of engagement of the panel with the partition when the top panel sags. We have found that inter-channel arcing, that is arc-overs between one portion of the channel and a portion of the channel in the next convolution, can be eliminated if the partition is flat, if the tops of the partition have predetermined widths, and if a predetermined gap is maintained between the tops of the partition and the panel.

The lamp according to the present invention is relatively inexpensive to manufacture since only the periphery of the partition is joined to the top panel. The design is such that the physical gap between the tops of the partition forming the channel and opposing surfaces avoids inter-channel discharge. We have also found that cracking of the seal between the peripheral portion of the partition and the inner surface of the top panel to which it is attached can be eliminated if differences between the height of the peripheral portion of the partition and the top panel are less than about 0.1 mm. To achieve this difference in height, the tops of the partition are preferably ground flat to achieve a uniformly planar surface. The frit is used to attach the peripheral portion of the partition to the panel and the thickness of the frit (when fused) defines the height of the peripheral portion of the partition. Preferably, the thickness of the frit sufficient to achieve bonding is about 0.1 mm. In this way the panel is free to sag and engage the tops of the inner portions of the partition thereby preventing arc-overs without having to seal the entire partition to the top panel.

BRIEF DESCRIPTION OF THE DRAWINGS

In FIGS. 3 and 5 the tops of the portions of the partition are not ground to equal height. In FIG. 4 the tops of the partition have been ground to the same height and the spacing between the tops of the partition and the top panel are uniform as established by the thickness of the frit.

DESCRIPTION OF THE PREFERRED EMBODIMENTS

Figure 1:
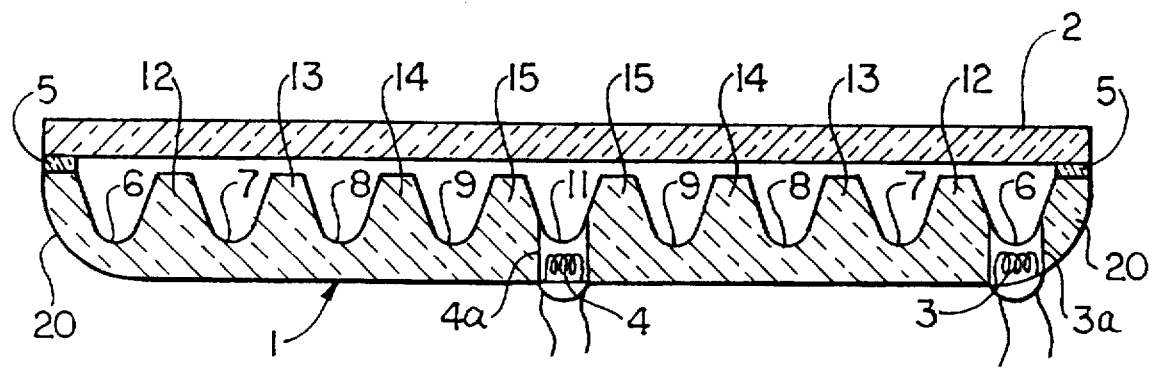
FIG. 1 is a cross-sectional view of a spiral channel flat compact fluorescent lamp according to the present invention.

Referring now to FIG. 1, a glass or ceramic bottom molded part 1 contains spiral channels 6, 7, 8, 9 and 11 and two electron-emitting electrodes 3 and 4. The channels are formed by a convoluted partition and depicted herein as 20, 12, 13, 14 and 15. A planar circular top glass panel 2 is sealed to the bottom molded part 1 by glass frit 5 at the top of peripheral portion 20. A reflective coating (not shown) is disposed upon the interior of each of the channels 6, 7, 8, 9 and 11, and the partition between them. A conventional phosphor coating is disposed over the reflective coating and the channels. A protective coating (not shown) is disposed on the inner surface of the top panel 2 and a conventional phosphor coating is placed upon the protective coating. The electrodes 3 and 4 are set in wells 3a and 4a in the molded part 1. When the glass is sealed and a fill of mercury and inert gas at low pressures is put in the envelope, panel 2 will sag to be closely adjacent to each of the tops of the partition 12, 13, 14 and 15 as will be described hereinafter.

Figure 2:
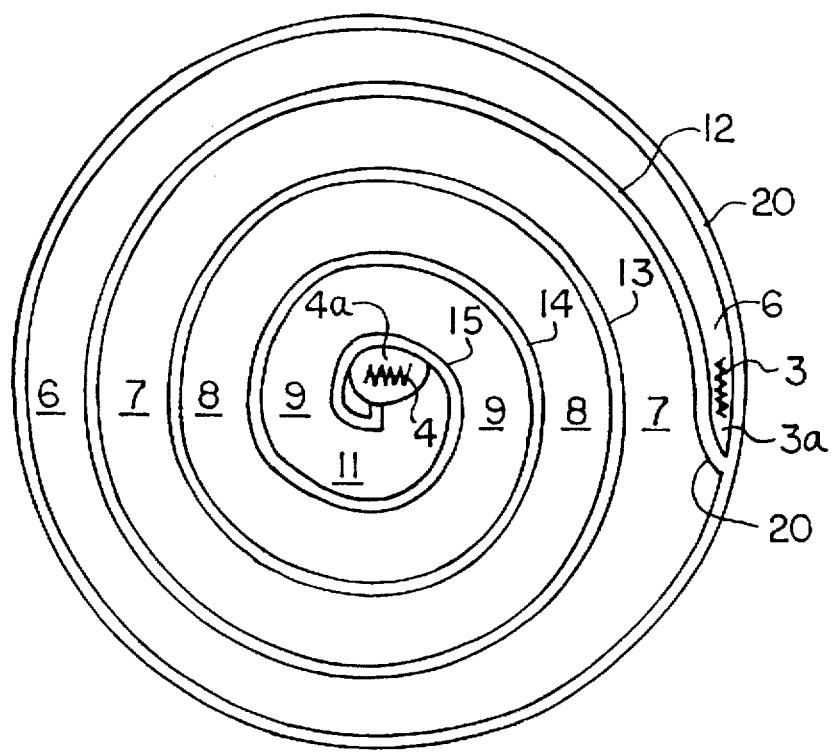
FIG. 2 is a plan view of the fluorescent lamp shown in FIG. 1 with its top panel removed.

Referring to FIG. 2, the top panel shown in FIG. 1 has been removed to reveal the spiral shape of the channels 6, 7, 8, 9 and 11 formed by the partition. The peripheral portion of the partition is numbered 20 and the balance or interior portion begins where partition 12 commences and is designated as 20a. Channel 6 ends in a well 3a which houses the electrode 3 and channel 11 terminates in a well 4a which houses the electrode 4.

Figure 3:
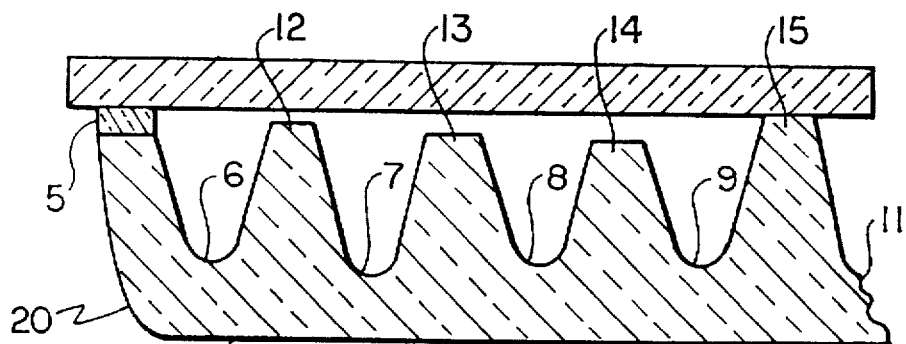
FIGS. 3, 4 and 5 are three cross-sectional views of different lamps showing the relationship between the tops of portions of the partition and the top panel.

Turning now to FIG. 3, a lamp is shown wherein the partition on the bottom molded part 1 has not been ground flat and the peripheral portion of the bottom molded part is frit sealed to the top panel 2. Without grinding, portions of the partition vary in height. As shown, portion 15 of the partition is higher than portion 20 of the partition which in turn is lower than portions 12 and 13 of the partition. Thus, because the portions of the partition are not of equal height, gaps between the tops of the portions of the partition and the top panel 2 vary thereby providing the possibility of inter-channel arc-overs. When the lamp is subjected to low pressure there will be a decrease in the gap at portions 12, 13 and 14 of the partition as a result of the panel sagging inwardly due to the atmospheric pressure on the outside of the lamp. But the decrease in the gap will be dictated by the heights of the portions 12 and 15 of the partition which inhibit inward movement. We have found in mass production of the lamps, from one part to another, the height of the portions of the partition can vary at random and if the gap between the top panel 2 and any one of the portions of the partition is high a lateral inter-channel arc discharge probably will occur.

Figure 4:
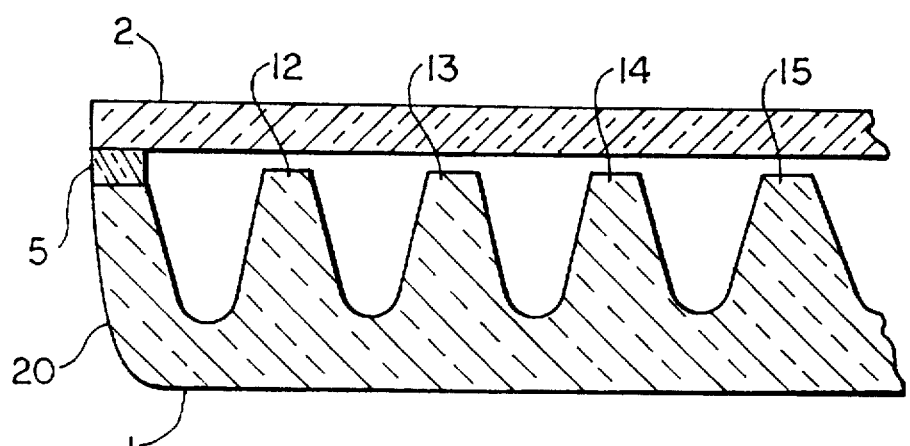

In FIG. 4 all portions of the partition on the molded part 1 have been ground flat. The peripheral portion 20 is sealed to top panel 2 with a glass frit 5. When the lamp is not subjected to low pressure none of the portions of the partition is in contact with the top panel 2 and the gaps between the tops of the partition and the inner surface of panel 2 is uniform. The width of the gaps is dictated by the thickness of the frit 5.

Figure 5:
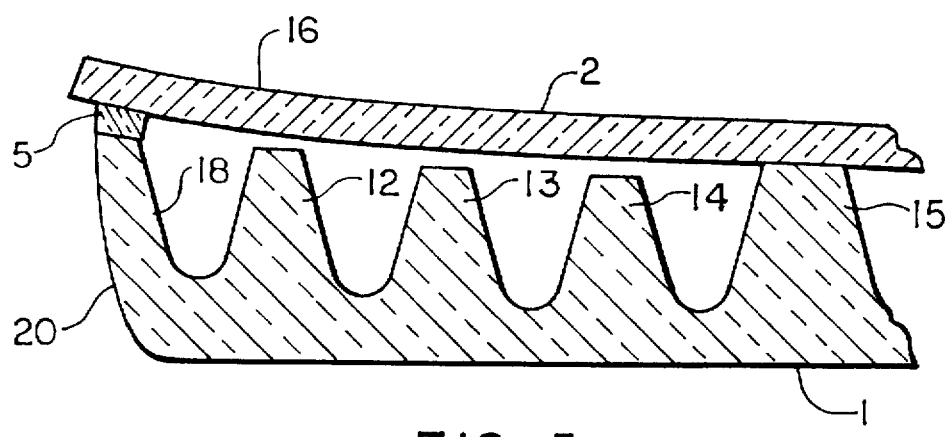

In FIG. 5 the effect of the atmosphere is shown when a lamp having a low internal pressure is subjected to atmospheric pressure. The portion 15 of the partition contacts the top panel 2 and the gaps at 12, 13 and 14 are reduced. It is important to recognize that the gap between any one of the portions of the partition and the panel must not be such as to create significant stress either on the frit seal 5 or region 16 which can cause cracking either at the seal 5 or in the region 16 which would result in a circular crack inside the periphery of the panel 2. In the embodiment shown in FIG. 5 the peripheral portion 20 of the partition including frit 5 is taller than the portions 12, 13, 14 and 15. Thus, the lamp is subjected to the above-mentioned stresses, even though the dimensions of the gap are controlled.

Figure 6:
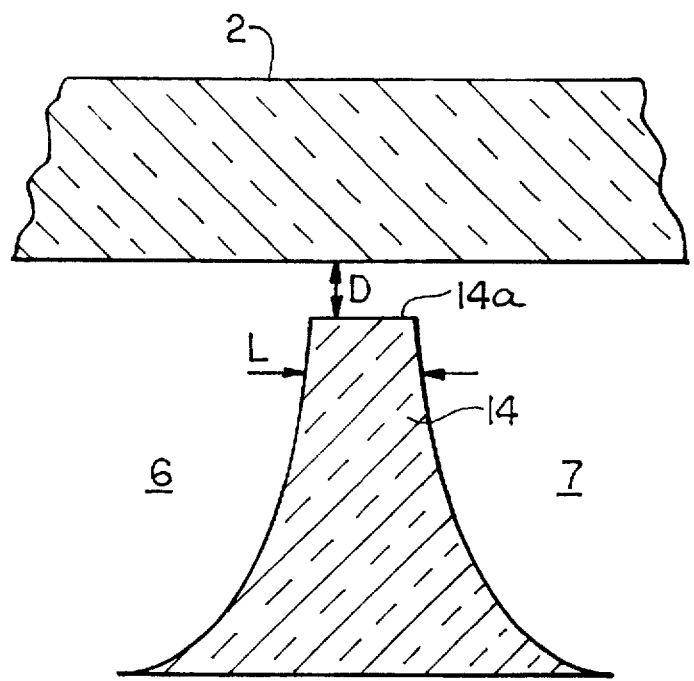
FIG. 6 is an enlarged fragmentary cross-sectional view showing the relationship between one of the portions of the partition and the top panel. The view especially shows the relationship of the width of the partition and its top relative to the spacing between the top of the partition and the top panel.

Referring to FIG. 6, a schematic example of a gap D is shown in relation to the channels 6 and 7. A typical arc discharge in channels 6 and 7 is in a direction perpendicular to the plane of the cross-section. The portion 14 of the partition has a gap D between the top 14a of the partition and the panel 2. The top 14a has a width L. Because of the existence of a radial field between electrodes in a spiral channel geometry lamp, the electrons and positive ions tend to move across the gap D. If the gap D is small enough, we found the portions 14 act as a third body to promote the electron and positive ion recombination resulting in the formation of neutrals N, that is they lose their charges. If the loss rate is substantially higher than the production rate of the charges across the gap the discharge across the gap is quenched leading to a very high impedance for discharge across the gap D. The impedance is higher as the gap D becomes smaller and the width L becomes larger. We have found that for lamp applications the width of the partition should be less than about 2 mm and thus the gap D should be as small as possible, that is the panel 2 touching or nearly touching the top 14a, although not sealed thereto. For normal operation of the lamp the impedance between channels, that is across gap D, should be substantially higher than the arc impedance for the regular discharge path. If the gap is 0 then the inter-channel arc impedance is infinite for any finite value of the regular arc impedance and the regular arc discharge takes place. We have found that for arcs of the length of 85 cm the gap D should be of such a width to obtain a gap-arc impedance higher than 100 ohms. With such gap-arc impedance, undesired inter-channel arc discharge can be prevented without the use of laborious and costly sealing of the gap.

In the construction of the flat compact fluorescent lamp of the present invention the gas filling is a rare gas and mercury. However, during the manufacture of the lamp certain impurities such as carbon monoxide, oxygen and water vapor can creep in. We have found that so long as these impurities are substantially eliminated, that is in concentrations less than a few parts per million, the lamp will function normally. The enumerated impurities are electron-attaching gases which tend to take electrons away from the discharge and transform themselves into negative ions which in turn recombine with positive ions or electrons to neutralize the volume occupied by the charge species. While impurities are known to cause difficulties in fluorescent lamps, the problems are exacerbated in flat compact lamps in which the arc path is not completely confined, that is the envelope is formed with only the periphery of the lamp being sealed. In concentrations of impurities greater than a few parts per million the regular discharge path becomes increasingly neutral leading to an increase in the regular arc impedance thus increasing the likelihood of inter-channel discharge. Thus, it is important to maintain the gases in the envelope substantially free of carbon monoxide, oxygen and water vapor.

In the preferred embodiment for a mercury at a concentration of $6 \times 10^{13}/cm^3$ corresponding to a cold spot temperature of 40° C., sufficient ionization takes place along the regular arc channel to excite the phosphor. At this point the regular arc impedance is much lower than the arc impedance at the gap provided the distance is small. To prevent the inter-channel arc we found the mercury concentration should be greater than $6 \times 10^{12}/cm^3$. With densities of about $6 \times 10^{10}/cm^3$ or $6 \times 10^{11}/cm^3$ there is a tendency for the arcing to take place between the channels. We have also found that the gap between the top of the partition and the panel should be less than about 0.4 mm and the width of the tops of the partition should be equal or greater than about 2 mm to prevent inter-channel discharge. However, to eliminate the occurrence of circular cracks in the top panel during storage and operation the gap should be less than about 0.1 mm for a width of the top of the partition which is about 2 mm.

Figure 7:
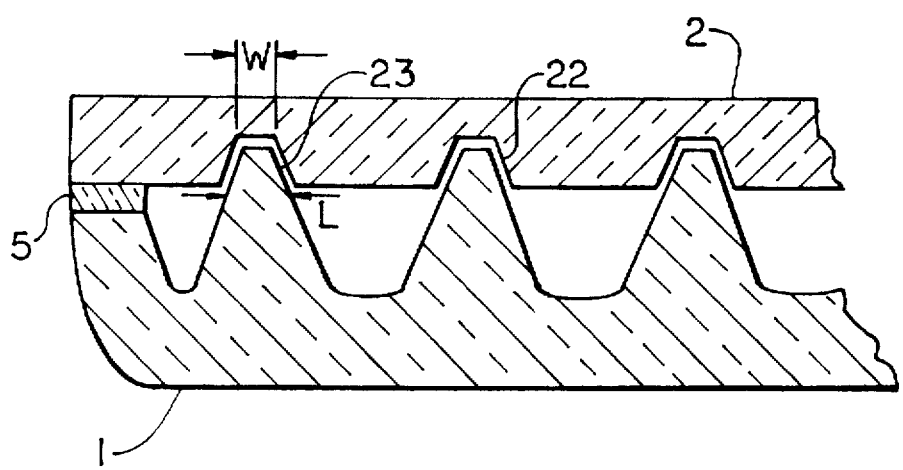
FIG. 7 is an alternative embodiment of the lamp wherein arc-over between channels is reduced further by increasing the length of the distance between channels.

Referring to FIG. 7, top panel 2 has a molded recess 22 formed in a shape to receive the tops of the partition. The gap-arc impedance is provided by the length L, fitting within the recess 22 such as explained with reference to FIG. 6.

While it is apparent that changes and modifications can be made within the spirit and scope of the present invention, it is our intention, however, only to be limited by the scope of the appended claims.

As our invention we claim:

1. A flat compact fluorescent lamp containing a fill of mercury and an inert gas, said lamp comprising:

a glass top panel having an inner surface and a glass bottom panel also having an inner surface;

a convoluted glass partition integral with said bottom panel having a substantially planar upper surface disposed between said inner surfaces of said top and bottom panels, said partition forming a convoluted channel having an initial and a terminal end, said partition having one edge which is integrally formed with said bottom panel and a peripheral portion which is joined to the inner surface of said top panel and an inner portion which can engage the inner surface of said top panel, said inner portion having a predetermined width at points of its engagement and a predetermined spacing between said points and said top panel;

means to seal the peripheral portion only of said convoluted glass partition to the inner surface of said glass top panel, said sealing means having a predetermined thickness, said predetermined thickness forming said predetermined spacing at said points, said sealing means forming a sealed envelope with said top and bottom panels, whereby to enable said panel to sag and provide said predetermined spacing with said partition and form said convoluted channel within said envelope;

a coating containing a phosphor on the inner surface of said envelope;

at least two electrode means for said lamp, one of said electrode means being disposed at the initial end of said convolution and the other being disposed at the terminal end, whereby an arc can be formed in said lamp between said electrode means which will not arc-over between adjacent portions of said channel thereby to excite said phosphor to emit light.

2. The lamp according to claim 1 wherein said predetermined thickness of said sealing means is sufficient to bond said peripheral portion to said top panel but insufficient to place significant strain upon said peripheral portion or said top panel to break them.

3. The lamp according to claim 2 wherein the predetermined thickness of said sealing means is sufficient for bonding but less than about 0.1 mm.

4. The lamp according to claim 1 wherein, except for said peripheral portion, said predetermined width is greater than about 2 mm and predetermined space is less than about 0.1 mm.

5. The lamp according to claim 1 wherein said convoluted channel is in the shape of a spiral.

6. The lamp according to claim 1 wherein said electrodes are disposed in wells at the initial and terminal ends of said channel.

7. The lamp according to claim 1 wherein said channel has a substantially uniform width throughout its length.

8. The lamp according to claim 1 wherein the mercury is at a concentration of more than $6 \times 10^{12}/cm^3$ corresponding to a cold spot temperature of 40° C. whereby to inhibit arc-over between adjacent channels.

9. The lamp according to claim 1 wherein said envelope is substantially free of carbon dioxide, oxygen and water vapor.

10. A fluorescent lamp having a fill of mercury and an inert gas, said lamp comprising:

a glass top panel, said top panel having generally flat outer and inner surfaces and a peripheral edge;

a glass bottom panel and a spirally shaped, substantially planar glass partition integrally formed on said bottom panel, said partition forming a spiral channel, said partition having a peripheral portion which is sealed to said top panel and an internal portion which abuts or nearly abuts said inner surface of said top panel, said peripheral portion and said internal portion being on substantially the same plane, the portion which abuts having a width at the point of its abutment greater than about 2 mm and a spacing between said point and said top panel less than about 0.4 mm;

means to seal only the peripheral portion of said spiral partition to said inner surface of said top panel whereby said top panel can sag and engage the internal portion of said partition, said partition and said bottom panel and top panel forming a sealed envelope, said sealing means having a predetermined height to provide said predetermined spacing and form a convoluted channel and whereby because of said sagging to inhibit arc-overs between adjacent sections of said channel;

a coating containing a phosphor on the inner surface of said envelope;

two electrode means for said lamp, one of said electrode means being disposed centrally of said convolution and the other being disposed peripherally of said convolution whereby an arc can be formed in said lamp thereby to excite said phosphor to emit light.

11. The lamp according to claim 10 wherein said channel has a substantially uniform width throughout its length.

12. The lamp according to claim 10 wherein said envelope is substantially free of carbon dioxide, oxygen and water.

13. The lamp according to claim 10 wherein the top of said partition is planar to provide said predetermined spacing.

* * * * *